United States Patent [19]

Matulevich

[11] 4,031,509
[45] June 21, 1977

[54] LOCKED AXLE DETECTOR FOR A MULTI-AXLED TRACTION VEHICLE

[75] Inventor: E. S. Matulevich, Erie, Pa.

[73] Assignee: General Electric Company, Erie, Pa.

[22] Filed: June 27, 1975

[21] Appl. No.: 590,982

[52] U.S. Cl. .................... 340/62; 340/268; 303/103; 180/105 E

[51] Int. Cl.² ............... G08B 21/00; B60T 8/04

[58] Field of Search .......... 340/52 R, 52 B, 62, 340/263, 268; 307/10 R; 180/105 E; 317/5; 303/94, 103; 244/111

[56] References Cited

UNITED STATES PATENTS

| 2,601,140 | 6/1952 | Hines | 340/268 |
|---|---|---|---|
| 2,735,090 | 2/1956 | Maenpaa | 340/268 |
| 3,699,563 | 10/1972 | Cass | 340/268 |
| 3,706,351 | 12/1972 | Neisch | 180/75 |
| 3,767,270 | 10/1973 | Urban | 303/21 BE |
| 3,880,475 | 4/1975 | Booher | 303/21 BE |

*Primary Examiner*—John W. Caldwell
*Assistant Examiner*—Joseph E. Nowicki
*Attorney, Agent, or Firm*—A. S. Richardson, Jr.

[57] ABSTRACT

A multi-axled traction vehicle is equipped with a plurality of means for sensing the speeds of its respective drive axles, and control means is provided for producing a predetermined warning signal if the sensed speed of any one of the axles is under a predetermined low threshold level. In addition, means is provided for disabling the control means if none of the sensed axle speeds exceeds a predetermined higher threshold level, thereby preventing the production of a warning signal when the vehicle is not in motion.

6 Claims, 3 Drawing Figures

LOCKED AXLE DETECTOR FOR A MULTI-AXLED TRACTION VEHICLE

BACKGROUND OF THE INVENTION

This invention relates to multi-axled traction vehicles, and more particularly it relates to means for detecting a locked axle condition on such a vehicle.

A traction vehicle such as a railway locomotive has a plurality of axles for driving the wheels of the vehicle along a track. In operation one of the axles may become locked against rotation due to seizure of bearings or the like. If this condition were not promptly detected and corrected, it could have a number of adverse consequences, including the wearing of flat spots on the wheels. In order to minimize such difficulties, it is desirable to warn the engineer of the locomotive that a locked axle of a sliding wheel condition has occurred.

Accordingly, a general objective of the present invention is to provide an improved scheme on a multi-axled traction vehicle for detecting when one or more (but less than all) of the axles are locked.

As will be hereinafter described, the present invention has the capability of detecting a predetermined speed differential between axles which are rotating at different rates. Therefore another possible application of this invention is to detect an untoward increase in the speed of one axle due to a wheel slip condition. It has heretofore been proposed in the wheel slip art (see U.S. Pat. No. 3,699,563 granted on Oct. 17, 1972) to separately sense the speed of each drive axle of a locomotive by means of a magnetic proximity detector mounted adjacent to the teeth of a gear which rotates with the axle, thereby producing a periodic signal whose frequency varies with the rotational speed of the axle, which signal is then converted to an analog signal proportional to frequency. The analog signals from the speed sensors associated with the respective axles of the locomotive are compared with one another, and an output is produced whenever the difference between the signals of least and of greatest magnitudes exceeds a predetermined amount which corresponds to an intolerable difference between the slowest axle speed and the fastest axle speed of the locomotive.

The use of magnetic proximity detectors to detect the speed of rotating parts or apparatus is well-known in the traction vehicle art. Such a detector has many advantages, including relatively low initial cost and maintenance expense and high reliability. There are, however, a few shortcomings. The amplitude of the signal produced by a magnetic proximity detector tends to vary with frequency and depends on the distance or air gap separating the pickup head of the detector from the surface of the adjacent gear teeth. The minimum speed sensitivity of such a detector is also a function of the aforesaid gap. Where a constant, predetermined amplitude is desired, the output of the detector can be connected to an operational amplifier or the like, as is known. But this does not solve the pickup sensitivity problem, which makes it difficult to apply magnetic proximity detectors in a locked axle detecting scheme where response to axle speeds close to zero is required.

Accordingly, another general objective of the present invention is to provide an improved axle speed differential detecting scheme which can utilize speed sensors having inprecise and possibly unequal pickup sensitivities and which nevertheless is suitable for locked axle detection purposes.

A further object is to provide an accurate speed differential detecting scheme utilizing parts and circuit components which separately have relatively wide tolerances.

Yet another object is the provision of a system for detecting a predetermined speed differential among a plurality of axles on a traction vehicle wherein the need for precision adjustments of the system is minimized in the event components are replaced or the wheels wear unequally.

SUMMARY OF THE INVENTION

In carrying out my invention in one form, I provide on a multi-axled traction vehicle a plurality of detectors for sensing the speeds of the respective axles of the vehicle. The speed detectors are connected to suitable control means operative to produce a predetermined warning signal in response to the sensed speed of any one of the axles being lower than a predetermined first threshold level (e.g., 2.5 miles per hour). The speed detectors are also connected to "no-motion" means which disables the control means, thereby preventing it from producing the warning signal, except when the speed of at least one of the axles exceeds a predetermined second threshold, indicating that the vehicle indeed is in motion. The second threshold level is higher than the first threshold level, thereby providing a predetermined "delta" speed or "deadband" which eliminates the need for precise adjustment of the respective threshold levels or for tight tolerances in the various components of the system. As a result, this system performs satisfactorily as a locked axle detector in spite of expectable variations in the pickup sensitivities of the respective speed detectors or in the wheel diameters of the vehicle. Preferably the control means includes time delay means for delaying its operation, once permitted by the no-motion means, for at least a predetermined length of time, thereby correspondingly delaying the production of the warning signal so as to avoid false response to momentary wheel slip or slide conditions.

My invention will be better understood and its various objects and advantages will be more fully appreciated from the following description taken in conjunction with the accompanying drawings.

DESCRIPTION OF SPECIFIC EMBODIMENT

Figure 1:
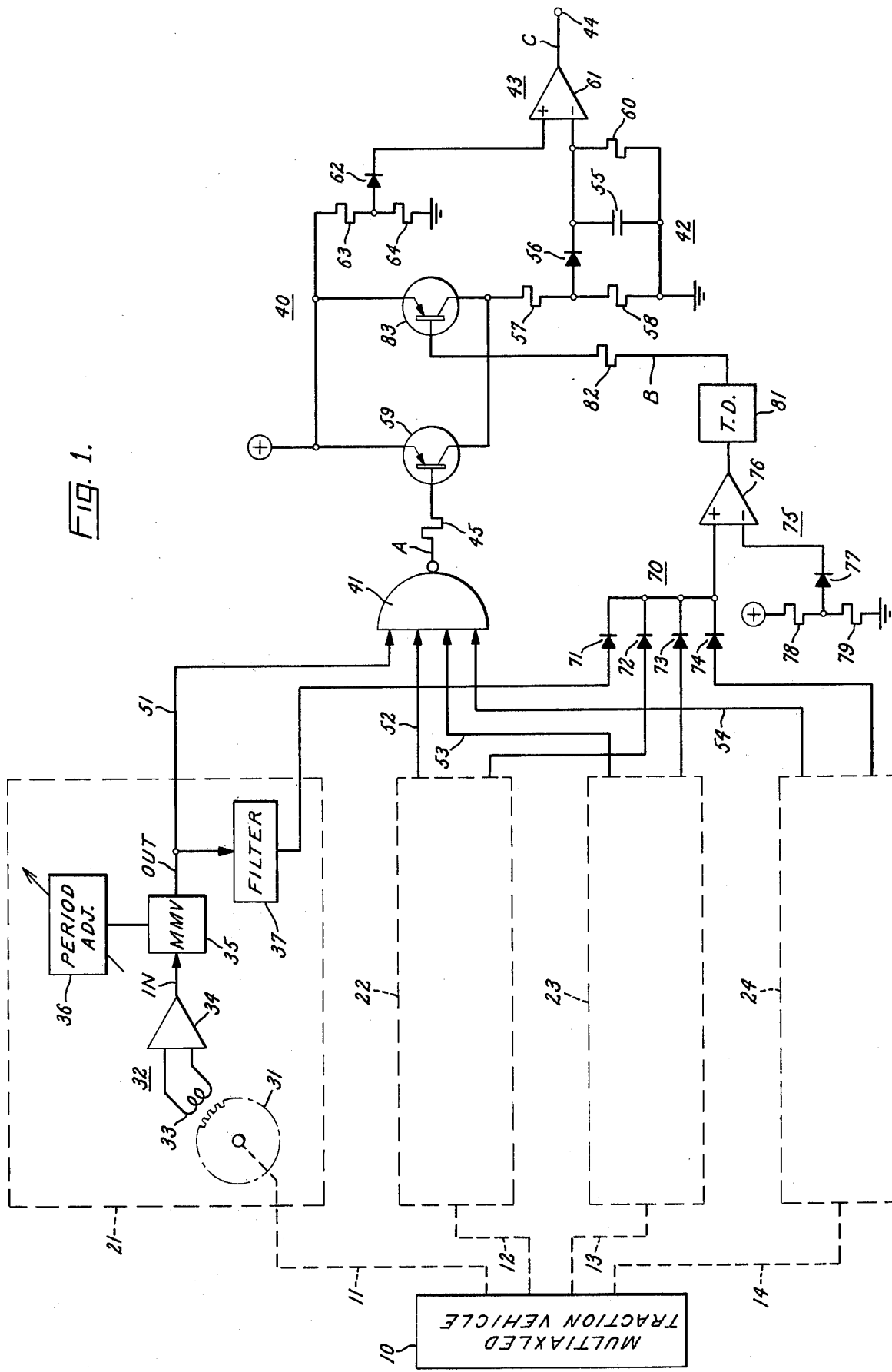
FIG. 1 is a schematic diagram of a circuit embodying my invention for detecting a locked axle on a multi-axled vehicle.
Figure 2:
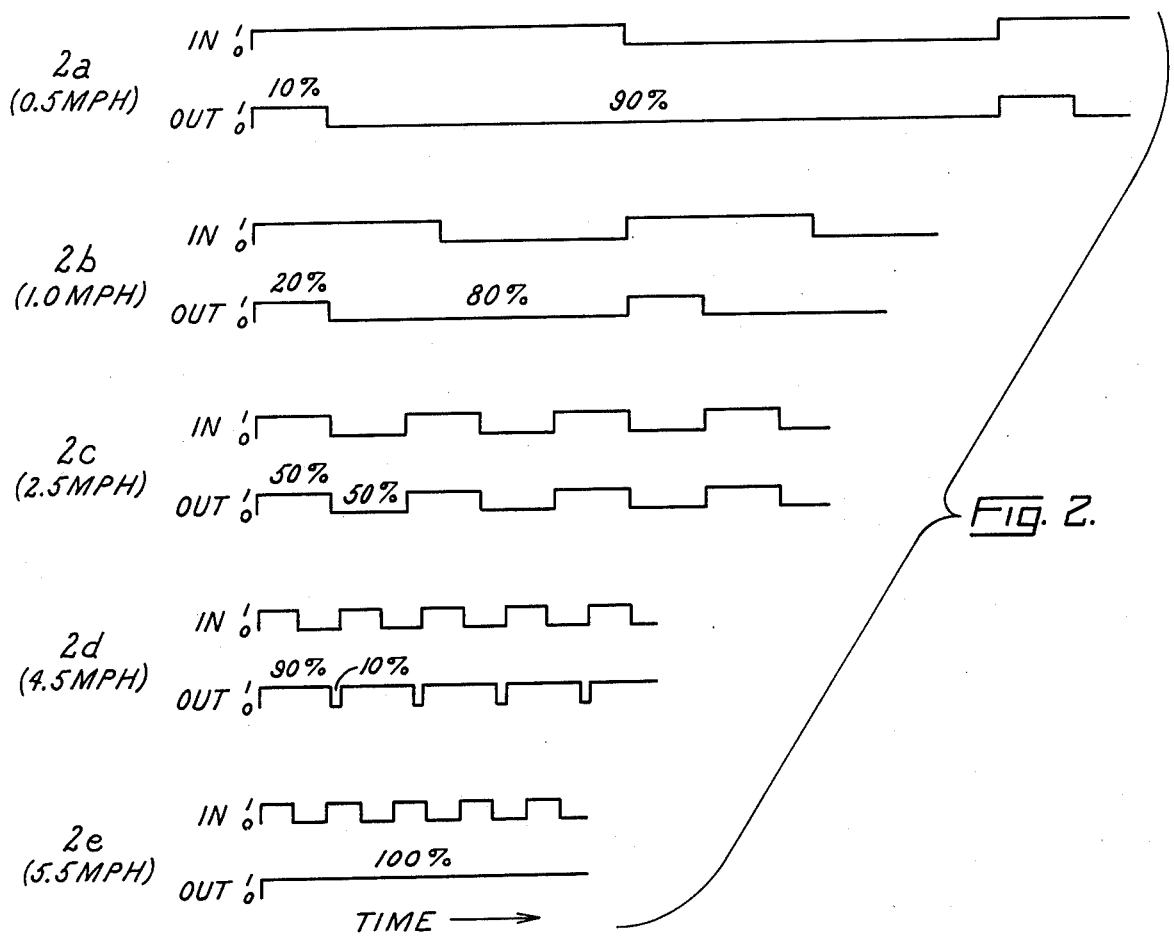
FIG. 2 is a family of charts which illustrate, with reference to time and for five different vehicle speeds, the inputs and outputs of the monostable multi-vibrator shown in block form in FIG. 1.

Referring now to FIG. 1, there is shown symbolically at 10 a traction vehicle such as a locomotive or a transit car which has a plurality of drive axles. While just four axles 11, 12, 13, and 14 have been indicated in FIG. 1 by way of example, it will be understood that my invention is equally useful with multi-axled vehicles which are propelled by more or less than four. Paired wheels (not shown) are afixed to each axle.

Coupled to the respective axles 11, 12, 13, and 14 are a corresponding number of duplicate speed sensing means 21, 22, 23, and 24. Each of these axle speed sensors is suitably constructed and arranged to generate an output signal "OUT" which is representative of the speed of the associated axle. In the illustrated embodiment of my invention, the speed sensor 21 comprises a toothed ferromagnetic disk or gear 31, a conventional magnetic proximity detector 32 comprising a sensing coil 33 and an integral operational amplifier 34, and a retriggerable monostable multi-vibrator 35. The detector 32 is mounted adjacent to the teeth of the gear 31 which in turn is suitably disposed for rotation with the axle 11 of the vehicle 10. In one practical embodiment the gear 31 is threaded in the end of the shaft of the traction motor which drives the axle 11, and the proximity detector 32 is mounted in the bearing cap of the same motor so that the magnetic core (not shown) of its sensing coil 33 is spaced from the teeth of the gear by a relatively short air gap. By shimming the detector 32, the size of this gap can be adjusted as desired. However, it will have relatively wide tolerances, varying within a range from 0.01 to 0.08 inches, for example.

As the gear 31 rotates, its teeth move past the magnetic proximity detector 32, thereby cyclically inducing in the coil 33 a periodic signal whose frequency is proportional to the angular velocity of the axle 11 and hence to the linear velocity of the vehicle 10 (assuming perfect cohesion between the associated wheels and the stationary surface or track which they are traversing). This periodic signal serves as an input to the operational amplifier 34 which conditions the signal by amplifying and shaping it. The output of the latter component is supplied as a cyclic input signal "IN" to the retriggerable monostable multi-vibrator 35. The minimum speed or pickup sensitivity of the detector 32, i.e., the axle speed below which the detector will not produce any "IN" signal, is a function of the aforesaid air gap, and consequently in practice it can vary from one axle installation to another over a relatively wide range. By way of example, an order of magnitude variation in the pickup sensitivity has actually been measured, from 0.1 to 1.0 miles per hour (equivalent vehicle speed).

The monostable multi-vibrator 35 in the axle speed sensing means 21 can be of conventional construction. In response to its cyclic input changing from low or 0 state to a high or 1 state, this component further conditions the input signal by producing a single pulse of constant amplitude and duration at its output. By appropriately selecting or adjusting the time constant of an RC circuit in the monostable multi-vibrator, as is depicted functionally in FIG. 1 by the period adjusting block 36, the output pulse can have whatever duration or period is desired. So long as the period of its cyclic input signal is longer than the period determined by 36, the monostable multi-vibrator 35 is operative to generate a train of discrete output pulses at a frequency which is proportional to that of the input signal and hence proportional to the speed of the associated axle 11. On the other hand, for axle speeds higher than a predetermined minimum magnitude the period of the input signal will be so short that the monostable multi-vibrator 35 is automatically retriggered or recycled prior to the expiration of its preset period, whereby its output "OUT" no longer comprises a train of discrete pulses but rather is a continuous high (1) signal. In a preferred embodiment of my invention the period of the monostable multi-vibrator 35 is substantially the same as that of the input signal at an axle speed equivalent to a vehicle speed of the order of 5 moles per hour.

FIGS. 2a through 2e illustrate the output signal "OUT" generated by the monostable multi-vibrator 35 for input signals "IN" of five different frequencies which correspond, by way of example, to vehicle speeds of 0.5, 1.0, 2.5, 4.5, and 5.5 mph, respectively. In each of the first four charts the speed is within a predetermined range between nearly zero and the given magnitude of 5 mph, and the output signal therefore comprises a train of pulses which have constant amplitude and duration and which recur at the same frequency as the input signal. It will be observed that each of these pulse trains has a duty cycle (i.e., the ratio of pulse duration to total period) proportional to its frequency, and consequently its average value is representative of the indicated axle speed. However, for axle speeds over the given minimum, such as at 5.5 mph which is shown in the fifth chart (FIG. 2e), the output will remain continuously high due to the monostable multi-vibrator 35 being periodically recycled prior to the time its output pulse is set to expire.

With reference again to FIG. 1, it will be seen that control means 40 is coupled to the output of all of the speed sensors, 21, 22, 23, and 24. In the preferred embodiment of my invention, the control means 40 comprises a NAND logic component 41, a time delay circuit 42, and a level detecting means 43 having an output terminal 44. This control means is operative in response to the sensed speed of any one (but less than all) of the axles being lower than a predetermined first threshold level to produce a predetermined control signal at the output terminal 44. The control signal when produced can be used to actuate an alarm or warning signal and/or to initiate any automatic protective or corrective action that is desired.

The NAND logic component 41 of the control means 40 has a plurality of inputs which respectively receive the output signals generated by the speed sensors 21, 22, 23, and 24 to which these inputs are connected over lines 51, 52, 53, and 54, respectively. Consequently the output signal of the component 41, which signal appears on line A in FIG. 1, is in a 1 state so long as at least one of the inputs supplied to this component is 0 and switches to 0 only when all of the inputs are simultaneously 1. The signal on line A controls the energization of the time delay circuit 42.

As is shown in FIG. 1, the time delay circuit 42 comprises a capacitor 55 having one plate connected directly to a reference potential bus (shown grounded). For charging the capacitor 55, its second plate is connected through an isolating diode 56 to the common junction of a pair of resistors 57 and 58 which form a voltage divider between the reference bus and the collector of a PNP transistor 59 whose emitter is connected directly to a relatively positive terminal of a regulated control power supply. (The transistor 59 is shunted by another PNP transistor 83 which is described hereinafter and which for present purposes should be assumed to be turned off.) The base of the transistor 59 is connected through a resistor 45 to the line A, and during any interval when the NAND logic component 41 has a 0 output the transistor 59 is turned on to conduct charging current through the resistor 57 and the capacitor 55. A resistor 60 connected across the capacitor 55 provides a path for discharging the capacitor during intervals when, because of a 1 output from the NAND logic component 41, the transistor 59 is turned off.

The level of charge accumulated on the capacitor 55 determines the signal at the inverting input of an operational amplifier 61. This component is connectd in a differential amplifying mode to serve as the level detecting means 43. Its non-inverting input is connected by way of a diode 62 to a voltage divider comprising resistors 63 and 64 in series between the positive supply terminal and the reference bus, and the ohmic values of these resistors are selected to provide a fixed reference signal or bias of desired magnitude for the operational amplifier 61. The output of this amplifier, which is designated line C in FIG. 1, is connected to the output terminal 44. So long as the capacitor 55 is fully charged, the non-inverting input is greater than the bias, and consequently the operational amplifier 61 has a 0 output. But whenever the capacitor charge is less than a critical amount determined by the bias, the output switches to a 1 state which is the previously described control signal. The above-mentioned first threshold level of axle speed depends on the setting of this bias in conjunction with the period adjustment of the monostable multi-vibrator 35 and the selection of charging and discharging time constants of the capacitor 55.

In steady state operation, the level of charge on the capacitor 55 is a function of the duty cycle of the transistor 59 (assuming that the parallel transistor 83 is turned off continuously). If the duty cycle were 100 percent (transistor 59 turned on continuously), the capacitor would be fully charged, and for lesser duty cycles the capacitor charge is correspondingly reduced. When all axle speeds except one are higher than the aforesaid predetermined minimum magnitude (which is assumed by way of example to be equivalent to a vehicle speed of 5 mph), it will be apparent that the duty cycle of the transistor 59 is exactly the same as that of the one pulse train which is generated by the speed sensing means associated with the slowest axle. (It is only during intervals coinciding with the discrete 1 pulses of that one train that the output of the NAND logic component 41 is 0 and the transistor 59 is turned on.) Therefore, so long as the speed of the slowest axle is under 5 mph, the steady state capacitor charge will depend on the average value of the pulse train which reflects the slowest axle speed. The critical amount of capacitor charge, above which there is no output signal on line C and below which the level detecting means 43 is effective to produce a 1 output, is obtained at an axle speed equivalent to a predetermined fraction of 5 mph. In one practical embodiment of my invention, parameters have been suitably selected and adjusted so that this fraction is one-half, in which case the first threshold level of axle speed is equivalent to a vehicle speed of approximately 2.5 mph.

In the event the slowest axle speed were to decrease suddenly from over 5 mph to under the first threshold level of 2.5 mph, the time delay circuit 42 of the control means 40 will delay production of the ultimate output signal for at least a predetermined length of time. This deliberate delay, which may by way of example be 5 seconds long, is obtained by appropriately selecting the charging and discharging time constants of the capacitor 55, which time constants determine how long it takes the charge accumulated on this capacitor to decay from a fully charged amount to below the aforesaid critical amount. Thus a below-first-threshold-level axle speed has to continue to the prescribed length of time before a 1 output signal is produced.

To prevent operation of the control means 40 when all of the axles are rotating at speeds under the first threshold level or are at rest (no motion), the locked axle detector of my invention includes disabling means which is also controlled by the axle speed sensors. The disabling means preferably comprises an OR logic circuit 70 coupled to all of the speed sensing means 21–24, and level detecting means 75 connected to the output of the OR circuit.

The OR logic circuit 70 consists of an array of diodes 71, 72, 73, and 74 whose cathodes are connected in common and whose anodes are separately connected to electric filters 37 in the respective speed sensors 21, 22, 23, and 24. Each electric filter 37 is energized by the train of discrete pulses generated by the monostable multi-vibrator 35 of the associated speed sensor, and the magnitude of its analog output signal therefore varies with the average value of that pulse train. Consequently the analog signal is representative of axle speed up to the aforesaid minimum magnitude at which the monostable multi-vibrator output remains continuously high. The analog output signals from the filters in the respective speed sensors are fed to the parallel diodes 71–74, and the highest one is supplied to a non-inverting input of an operational amplifier 76 which is connected in a differential amplifying mode to serve as a level detecting means 75. For this purpose the inverting input of the operational amplifiers 76 is connected through a diode 77 to the juncture of a pair of resistors 78 and 79 forming a voltage divider between the relatively positive supply terminal and the reference bus.

The ohmic values of the resistors 78 and 79 are selected to provide a fixed bias of desired magnitude to the operational amplifier 76. If and when at least one of the analog output signals from the speed sensors 21–24 is higher than a given magnitude which is determined by this bias, the output of the operational amplifiers 76 has a high or 1 state. On the other hand, so long as none of the analog signals exceeds that magnitude, the output will have a low or 0 state. The given magnitude of analog signal corresponds to a pulse train frequency of predetermined magnitude which in turn is first reached when the speed of the fastest axle attains a predetermined second threshold level. In accordance with my invention, this second threshold level of axle speed is higher than the aforesaid first threshold speed level. In one practical embodiment of the invention, parameters have been suitably selected and adjusted so that the second threshold level is equivalent to a vehicle speed of approximately 5.0 mph. (The minimum magnitude of axle speed which causes the output of the monostable multi-vibrator 35 in each speed sensor to remain continuously high should equal or exceed this second threshold level.)

The output of the operational amplifier 76 is connected by way of a time delay block 81, a line B, and a resistor 82 to the base electrode of the above-mentioned transistor 83 which parallels the transistor 59 in the control means 40. The transistor 83 is turned off when the signal on line B is in a high 1 state and turned on when there is a low signal 0 on this line. The time delay block 81 is intended to serve a hysteresis function whereby, in the event the fastest axle is rotating at a speed barely over the aforesaid second threshold level, the signal on line B will give a positive indication that this threshold has been exceeded even if the output state of the operational amplifier 76 were to change periodically due to ripple in the analog signal representing the fastest axle speed. For this purpose the time delay block 81 can comprise an integrator arranged to sustain a continuous 1 signal on line B once this signal is produced in response to any axle speed rising above the second threshold level.

So long as the signal on line B is 0 (indicating that none of the sensed axle speeds exceeds the aforesaid second threshold level), the above-described disabling means is effective, through the action of the turned on transistor 83, to keep the capacitor 55 in the time delay circuit 42 of the control means 40 charged above the aforesaid critical amount, thereby preventing the production of the control signal on line C regardless of the output state of the NAND logic component 41. Consequently no control signal can be produced even if the speed of one or more axles is under the aforesaid first threshold level. On the other hand, when the signal on line B is 1 (indicating that the speed of at least one axle is higher than the second threshold level), the transistor 83 is turned off, thereby permitting production of the control signal on line C under the circumstances explained above in connection with the description of the control means 40. As a result, the production of the control signal on line C indicates that the speed of at least one axle is lower than the first threshold level while the speed of another axle is higher than the second threshold level.

Figure 3:
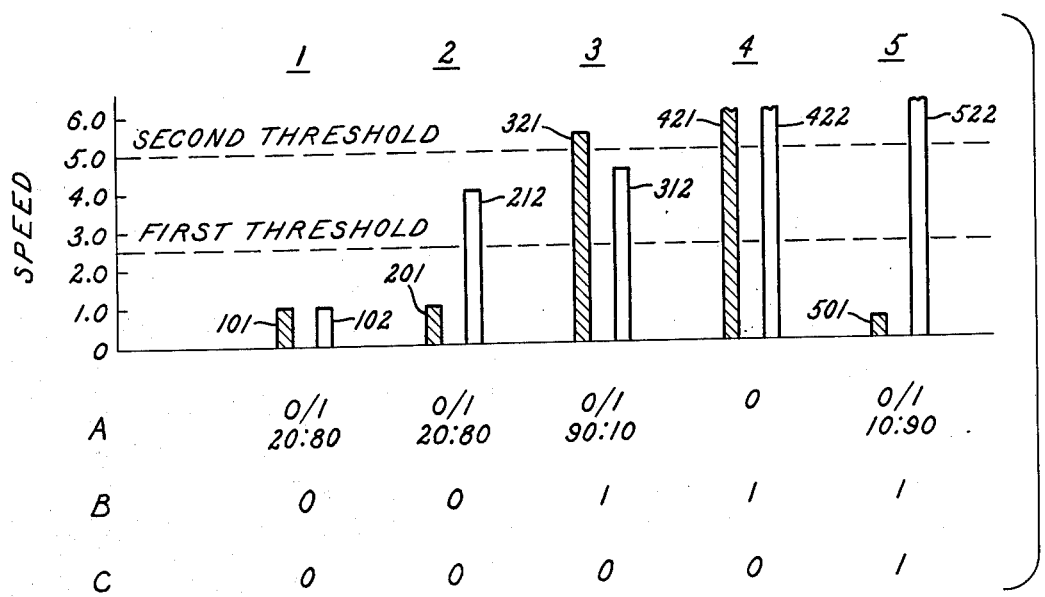
FIG. 3 is an array of speed bar graphs together with a table showing the signal states on lines A, B, and C in the circuit of FIG. 1 for five different combination of axle speeds.

The overall operation of the illustrated axle speed differential detecting means will now be summarized with reference to FIG. 3 which shows five different combinations of axle speeds. Each shaded bar in FIG. 3 is intended to represent the speed of one axle of the vehicle, and each open bar represents the speed of the other drive axles on the same vehicle. In case 1, the vehicle is assumed to be moving very slowly with all axles rotating at the same speed (shown as 1.0 mph for both the one axle 101 and the others 102). This speed is under the first threshold level, and the output signal on line A from the NAND logic component 41 will periodically change from 0 (20 percent of the time) to 1 (80 percent of the time) in proportion to the sensed low speed. The duty cycle of the transistor 59 is consequently 20%, but no control signal can be produced on line C because of the absence of a 1 signal on line B at the assumed low speed.

For case 2 in FIG. 3, the vehicle is moving faster than in case 1 and the speeds of all except one of its axles (see open bar 212) are assumed to be within a range or band defined by the first and second threshold levels. The one axle speed (shaded bar 201) is again assumed to be lower than the first threshold. Since none of the axle speeds exceeds the second threshold, there is no signal on line B. Without a 1 signal on line B, no control signal can be produced on line C even though the signal on line A has the same 0-to-1 ratio as in case 1 due to the slowest axle having a speed of only 1 mph.

In case 3 it is assumed that the speed of only one axle (bar 321) is higher than the second threshold level and the speeds of the other axles (bar 312) are slightly under the level (e.g., 4.5 mph). Since the sensed speed of the fastest axle is now sufficiently high to cause the level detecting means 75 to switch from low to high output states, a 1 signal is provided on line B, but no control signal can be produced on line C in this case because the 0-to-1 ratio of the signal on line A, as determined by the speeds of the slower axles, approaches 90:10 and the resulting 90% duty cycle of the transistor 59 is too great to allow the charge on capacitor 55 to decay to that critical amount which would cause a 1 output on line C. The same result is obtained when all axle speeds exceed the second threshold level, as is depicted by the bars 421 and 422 for case 4 in FIG. 3.

Turning now to case 5 in FIG. 3, it will be seen that the speeds of all except one of the axles (bar 522) are assumed to exceed the second threshold level whereas the one axle (bar 501) has a speed (e.g., 0.5 mph) under the first threshold level. In this case there is a 1 signal on line B and the 0-to-1 ratio of the signal on line A is such that the transistor 59 has a duty cycle of only 10%. Assuming that these conditions continue for long enough (e.g., at least 5 seconds) to allow the charge accumulated on capacitor 55 to decay below its critical amount, the control means 40 will be effective in case 5 to produce a 1 control signal on line C. The delay in the response of the control means desirably prevents operation of my speed differential detecting means in the event of a momentary wheel slip or slide or other transient disturbance.

It will be observed in FIG. 3 that the second threshold level of axle speed exceeds the first threshold by a fixed margin (e.g., 2.5 mph). Under normal conditions this margin or band determines the minimum speed differential which must exist between the fastest and slowest axles in order for a control signal to be produced. Providing such a margin offers a number of advantages. The circuit components can have relatively wide tolerances, and precision adjustments are not necessary when components are changed or as the wheels of the vehicle wear. This saves manufacturing costs and maintenance expenses. In addition, there is no need to synchronize the pulse trains generated by the respective speed sensors 21–24. In this connection, it should be noted that the actual duty cycle of the transistor 59 can be somewhat less than that of the pulse train associated with the slowest axle if there are asynchronous gaps between successive pulses in the trains generated by the other speed sensors. In operation the detector will continue to function correctly if the first threshold level of axle speed were higher than the normal level shown in FIG. 3, providing it remains lower than the second threshold level. To minimize the influence of asynchronous pulse trains on the first threshold level, the minimum axle speed at which the output of each monostable multi-vibrator 35 remains continuously high is preferably selected to be approximately equal to the second threshold level of axle speed.

By setting the first and second threshold levels of axle speed at the relatively low magnitudes shown in FIG. 3, the above-described speed differential detecting means is particularly well suited for responding to a locked axle condition. It should be noted that the first threshold level of 2.5 mph is well above the range of variations of pickup sensitivity of the magnetic proximity detector 32, and consequently reasonable variations in the air gap between this detector and the gear 31 will not cause malfunction of my locked axle detecting scheme.

While a preferred embodiment of my invention has been shown and described by way of illustration, many modifications will probably occur to those skilled in the art. I therefore intend, by the concluding claims, to cover all such modifications as fall within the true spirit and scope of the invention.

What I claim as new and desire to secure by Letters Patent of the United States is:

1. For detecting a predetermined speed differential among a plurality of axles of a traction vehicle equipped with speed detectors that provide a corresponding plurality of input signals indicative of the speeds at which the respective axles are rotating, the improvement comprising:
   a. a corresponding plurality of signal conditioning means adapted to receive said input signals from said speed detectors, each of said signal conditioning means being operative to generate a train of discrete output pulses having an average value representative of the axle speed indicated by the associated input signal as that speed varies between nearly zero and a predetermined magnitude, and each of said signal conditioning means also including an electric filter energized in accordance with the corresponding output pulse train whose average value determines the magnitude of an analog output signal of said electric filter;
   b. control means coupled to said signal conditioning means and supplied with the output pulse trains respectively generated thereby, said control means being operative to produce a predetermined control signal in response to any one of said pulse trains having an average value indicating that the rotational speed of the associated axle is lower than a predetermined first threshold level, and
   c. disabling means comprising:
      i. an OR logic circuit coupled to the said signal conditioning means for receiving the respective analog output signals therefrom, and
      ii. level detecting means connected between said control means and said OR logic circuit for preventing the production of said control signal except when at least one of said analog signals exceeds a magnitude corresponding to a predetermined second threshold level of rotational speed of the associated axle, said second threshold level being higher than said first threshold level,
      whereby the production of said control signal indicates that the speed of at least one axle is lower than said first threshold level while the speed of another axle is higher than said second threshold level, said predetermined magnitude of axle speed being at least as high as said second threshold level.

2. For detecting a predetermined speed differential among a plurality of axles on a traction vehicle equipped with speed detectors that provide a corresponding plurality of input signals indicative of the speed at which the respective axles are rotating, the improvement comprising:
   a. a corresponding plurality of signal conditioning means adapted to receive said input signals from said speed detectors, each of said signal conditioning means being operative to generate a train of discrete output pulses having constant amplitude and duration and having variable frequency which is proportional to the axle speed indicated by the associated input signal as that speed varies between nearly zero and a predetermined magnitude;
   b. control means coupled to said signal conditioning means and supplied with the output pulse trains respectively generated thereby, said control means including:
      i. a NAND logic component having a plurality of inputs which respectively receive the pulse trains generated by said plurality of signal conditioning means,
      ii. a time delay circuit comprising a capacitor, means for charging said capacitor during intervals when said NAND logic component has a 0 output state, and a path for discharging said capacitor during intervals when said NAND logic component has a 1 output state, and
      iii. means for producing a predetermined control signal whenever the charge accumulated on said capacitor is less than a predetermined amount indicating that the rotational speed of any one of said axles is lower than a predetermined first threshold level; and
   c. disabling means coupled to said signal conditioning means and to said control means for preventing the production of said control signal so long as said input signals indicate that none of the axles is rotating at a speed exceeding a predetermined second threshold level which is higher than said first threshold level and for permitting production of said control signal when at least one of said input signals indicates that the rotational speed of the associated axle is higher than said second threshold level, whereby the production of said control signal indicates that the speed of at least one axle is lower than said first threshold level while the speed of another axle is higher than said second threshold level, said predetermined magnitude of axle speed being at least as high as said second threshold level.

3. The speed differential detecting means of claim 2 in which said disabling means is connected to said time delay circuit and is effective, except when at least one of said input signals indicates that the rotational speed of the associated axle is higher than said second threshold level, to keep said capacitor charged above said predetermined amount regardless of the output state of said NAND logic component.

4. In a locked axle detector for a traction vehicle having a plurality of axles adapted to rotate at speeds that can differ one from another, the combination of:
   a. a plurality of means for respectively sensing the rotational speeds of said axles, each of said speed sensing means comprising means for generating a train of discrete output pulses of relatively constant duration and variable frequency, the frequency of said pulse train being proportional to the rotational speed of the associated axle as that speed varies through a predetermined range;
   b. a NAND logic component having a plurality of inputs which respectively receive the pulse trains generated by said plurality of speed sensing means;
   c. time delay means comprising a capacitor, means connected to said NAND logic component for charging said capacitor during intervals when said component has a 0 output, and a path for discharging said capacitor during intervals when said NAND logic component has a 1 output, whereby the charge accumulated on said capacitor depends on the frequency of the pulse train generated by the speed sensing means associated with the axle that has the slowest rotational speed;
   d. means connected to said time delay means for producing a predetermined control signal in response to the charge on said capacitor being less than a predetermined amount; and e. disabling means coupled to said plurality of speed sensing means for preventing the production of said control signal except when the frequency of the pulse train generated by the speed sensing means associated with the axle having the fastest rotational speed exceeds a predetermined magnitude which is higher than the frequency at which said capacitor attains said predetermined amount of charge.

5. The locked axle detector of claim 4 in which said predetermined magnitude of frequency is reached when the fastest rotating axle has a speed equivalent to a vehicle speed of approximately 5 miles per hour.

6. The locked axle detector of claim 4 in which each of said pulse trains has a period equal to the reciprocal of its frequency and the constant duration of each of its pulses is substantially the same as the period of that pulse train when its frequency is equal to said predetermined magnitude.

* * * * *